United States Patent
Beauloye

[15] 3,661,472
[45] May 9, 1972

[54] FACING AND DEBURRING HANDTOOL

[72] Inventor: Ronald A. Beauloye, 2217 La Cresta Road, El Cajon, Calif. 92021

[22] Filed: Feb. 8, 1971

[21] Appl. No.: 113,155

[52] U.S. Cl. ..................................408/231, 30/92, 82/4 C
[51] Int. Cl. ...........................................................B23b 5/16
[58] Field of Search................30/263, 264, 276, 300, 310; 82/4 C; 29/103, 105; 408/227, 231

[56] References Cited

UNITED STATES PATENTS

| | | | |
|---|---|---|---|
| 2,900,858 | 8/1959 | Gauthier | 82/4 C |
| 3,127,663 | 4/1964 | Karlan | 30/300 X |
| 3,365,988 | 1/1968 | Karlan | 30/310 X |
| 3,266,345 | 8/1966 | Weisner | 408/227 X |

FOREIGN PATENTS OR APPLICATIONS

| | | | |
|---|---|---|---|
| 889 | 6/1911 | Great Britain | 82/4 C |
| 715,297 | 8/1965 | Canada | 82/4 C |

Primary Examiner—Robert C. Riordon
Assistant Examiner—J. C. Peters
Attorney—Knox & Knox

[57] ABSTRACT

A handtool for facing off and deburring the rough cut ends of plastic pipe, the cutting tool bit structure being mounted parallel to the work-receiving bore and being adjustable by projecting knobs which are also handles to aid the user in rotating the handtool while pressing the same onto the pipe, the casing of the handtool having a work-receiving bore and a thick block-like portion closing one end of the bore and providing support for the cutting tool bits in the form of small bores extending parallel to the axis of the pipe rather than in the usual transverse or radial disposition.

4 Claims, 4 Drawing Figures

INVENTOR.
RONALD A. BEAULOYE
BY
Knox & Knox

3,661,472

FACING AND DEBURRING HANDTOOL

BACKGROUND OF THE INVENTION

Several cutting and chamfering tools, for use both in the shop and in the field, have been developed, these prior art devices being, usually at least, conceived and designed for use on metal pipe. The cutting tool bits of prior devices are made adjustable for depth of cut and to compensate for wear in use and sharpening but are arranged at right angles or radially of the work-receiving bore and the chip-escape is ordinarily provided for by making the tool casing open at the end adjacent to these above mentioned radially mounted tool bits. In prior art devices some care must be exercised by the workman to avoid damaging the tool bits and there exists a need for a simple handtool into which a rough cut end of a plastic pipe can be pressed quickly and easily without fear of damaging the tool bit or the setting thereof, the pipe end ordinarily being pressed directly against the block-like portion closing the end of the work-receiving bore.

SUMMARY OF THE INVENTION

As claimed, this handtool is essentially a casing which is illustrated as a slightly elongated cylinder with an axial bore to receive the work, ordinarily a rough cut end of plastic pipe, the casing including a solid or block-like portion closing what may be considered the inner end of the bore and this solid portion is sufficiently thick, in the direction of the axis of the bore, to accommodate at least one cutting tool bit disposed parallel to the bore and adjustable and anchored by combined tightening knobs and handles. Since the work-receiving bore is closed at the end adjacent the tool bit structure, provision is made for escape of chips or cuttings. The tool bits perform the operations of facing off the rough cut end of the pipe and bevelling it both internally and externally for connection in couplings and the like.

DETAILED DESCRIPTION OF A PREFERRED EMBODIMENT

Figure 1:
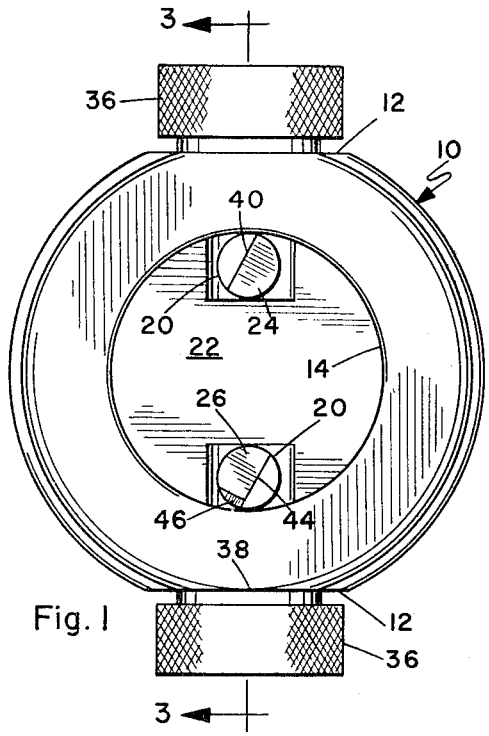
FIG. 1 is a front end elevation of the handtool.

The casing, generally indicated by the numeral 10, may be variously shaped but is conveniently made cylindrical as illustrated, slightly elongated and with flats 12 formed on diametrically opposite sides. A work-receiving bore 14 extends from what may be considered the front end of the handtool to a depth sufficient to assure proper orientation of the workpiece, ordinarily the rough cut end of a section or nipple of plastic pipe such as is commonly used in plumbing, as indicated at 16.

A solid or block-like portion 18 of the casing extends from the inner end of the bore 14 to the rear of the handtool and this portion 18 must have a considerable thickness dimension measured axially of the bore 14 to accommodate smaller bores 20. These smaller bores 20 are illustrated as of circular cross sectional shape and extend from the inner end or face 22 of the work-receiving bore 14 to a depth in the portion 18 sufficient to accept cutting tool bits 24 and 26. These smaller bores 20, tool bits 24 and 26, and above mentioned flats 12 are aligned in two opposing sets, diametrically opposed and slots 28 are provided in the casing, elongated in the same direction, to accommodate spindles 30 which are terminally threaded into the shank portions 32–34 of the tool bits 24 and 26. Tightening knobs 36 are fixed to the outer ends of the spindles 30.

The tightening knobs 36 are relatively large since they have a secondary but equally important function as handles to facilitate rotating the handtool in use. Flat faces 38 on the tightening knobs engage the flats 12 and the tool bits are thus firmly clamped in place, the slots 28 of course permitting adjustment of the tool bits toward and away from the bore 14.

Figure 4:
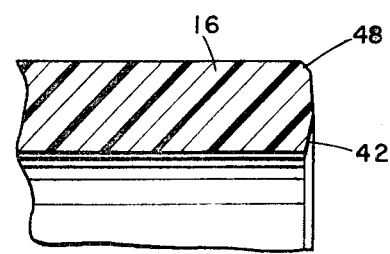
FIG. 4 is an enlarged fragmentary sectional view of a section of plastic pipe which has been faced off and bevelled internally and externally by the handtool.

The tool bit 24 has a cutting edge 40 to produce an internal bevel 42 on the pipe 16 as indicated in FIG. 4. The tool bit 26 has a dual cutting edge 44–46, the part 44 being the principal end facing cutting edge and the part 46 producing an external bevel 48 on the finished pipe 16.

Figure 2:
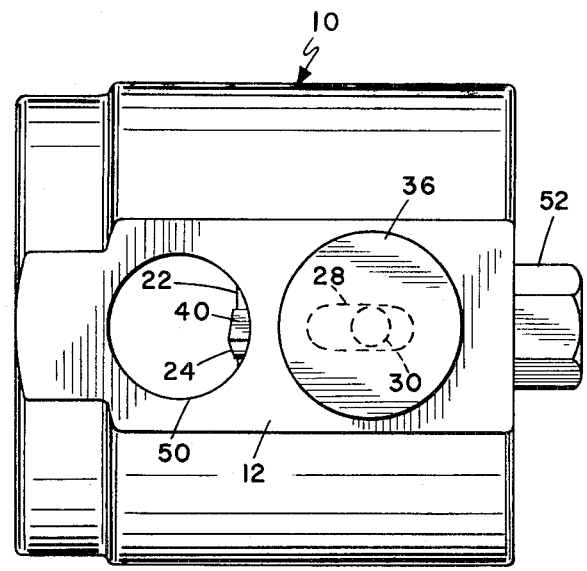
FIG. 2 is a top plan view of the same.
Figure 3:
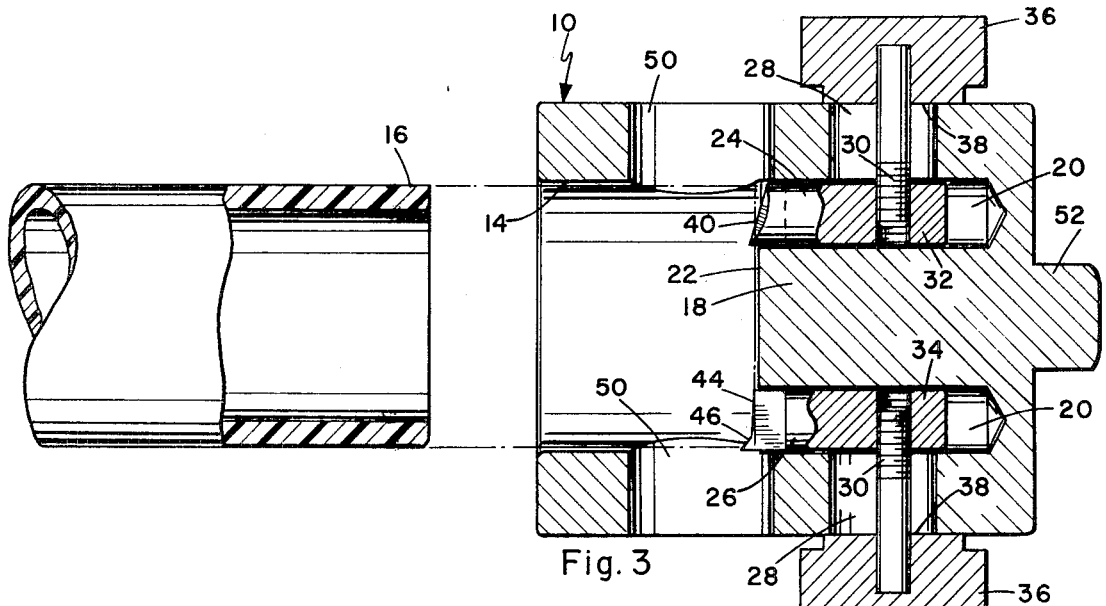
FIG. 3 is a vertical cross-sectional view of the handtool, taken substantially on the line 3—3 in FIG. 1, the figure being complemented by a side elevational view of a short section of a plastic pipe, partially broken away and shown in section, to illustrate the manner of using the invention.

Since the bore 14 is closed by the portion 18 of the casing it is necessary to provide chip-escape openings 50 adjacent to the cutting edges of the tool bits and these openings 50 extend rearwardly as well as forwardly of the cutting edges and inner end face 22 of the bore 14, as shown in FIGS. 1 and 2 as well as in FIG. 3, for more trouble free operation of the tool due to a lessened tendency for the chips or shavings to clog the cutters.

Finally, the casing 10 is provided with a wrench-receiving nut 52 fixed to or unitary with the casing and extending axially thereof to permit the user to apply extra torque on the handtool when required.

The operation of the handtool will be obvious from a consideration of the foregoing abstract and specification, it being noteworthy however that the item can be roughly used without damage and no great care is necessary in inserting the pipe since the tool bits are not easily broken because of their unique orientation and juxtaposition with the end face 22 which functions as a stop in certain cases where the rough cut end of the pipe is very irregular and preventing entry of the pipe beyond the tolerance or ability of the cutters to face off the end of the pipe.

I claim:
1. A facing and deburring handtool for use particularly with plastic pipe, comprising:
 a one-piece casing, slightly elongated and dimensioned to be handheld;
 said casing having a work-receiving bore in one end of the casing to receive a rough cut end of a pipe;
 said casing having a block-like portion at the other end of the casing and closing the inner end of said bore;
 a smaller bore in said block-like portion communicating with said work-receiving bore at the periphery thereof and extending parallel thereto;
 a cutting tool bit having a cutting edge at the junction of said bores, facing toward the work-receiving bore, and a tool bit shank portion in said smaller bore;
 said block-like portion having a thickness dimension greater than the length of said cutting tool; and
 means for securing said tool bit shank portion in said smaller bore for longitudinal adjustment therein, toward and away from said work-receiving bore and longitudinally thereof, for chamfering action on said rough cut end of a pipe when the handtool is pressed thereon and simultaneously rotated.

2. A facing and deburring handtool according to claim 1 wherein said block-like portion has a slot adjacent to and elongated in the direction of said smaller bore, and said means is a spindle threaded into said tool shank portion and slidable along said slot, with a tightening knob on the spindle to fix the cutting tool in adjusted position.

3. A facing and deburring handtool according to claim 2 and including a second smaller bore with a second cutting tool operatively mounted therein, said cutting tools between them having cutting edges to face off said rough cut end of a pipe and to bevel both the outer and inner edges, said casing having chip-escaping openings adjacent each of said cutting tools.

4. A facing and deburring handtool according to claim 3 and wherein said second cutting tool also is also adjustable with a tightening knob, and said tightening knobs are on opposite sides of said casing and project sufficiently from and on opposite sides of said casing as handles to facilitate manual rotation of the casing in use.

* * * * *